United States Patent [19]

Kajs

[11] 4,307,118
[45] Dec. 22, 1981

[54] PROCESS FOR PREPARING A CURD-LIKE PRODUCT FROM COTTONSEED AND OTHER OILSEEDS

[75] Inventor: Theresa M. Kajs, College Station, Tex.

[73] Assignee: The Texas A & M University System, College Station, Tex.

[21] Appl. No.: 46,825

[22] Filed: Jun. 8, 1979

[51] Int. Cl.³ .............................................. A23J 3/00
[52] U.S. Cl. .................................. 426/104; 426/656; 426/431; 426/517; 426/574; 426/802; 260/123.5
[58] Field of Search ............... 426/656, 431, 489, 507, 426/517, 574; 260/123.5

[56] References Cited

U.S. PATENT DOCUMENTS

| | | | |
|---|---|---|---|
| 2,415,426 | 2/1947 | Henning | 260/123.5 |
| 2,881,159 | 4/1959 | Circle et al. | 260/123.5 |
| 3,607,860 | 9/1971 | Yamato et al. | 260/123.5 |
| 3,814,748 | 6/1974 | Olson et al. | 260/123.5 |
| 3,912,824 | 10/1975 | Spiel | 426/656 X |
| 4,072,670 | 2/1978 | Goodnight, Jr. et al. | 426/656 X |
| 4,088,795 | 5/1978 | Goodnight, Jr. et al. | 426/656 X |
| 4,137,339 | 1/1979 | Kudo et al. | 426/656 X |
| 4,140,811 | 2/1979 | Ogasa et al. | 426/656 X |
| 4,147,811 | 4/1979 | Abe | 426/656 X |
| 4,172,828 | 10/1979 | Davidson et al. | 260/123.5 |

OTHER PUBLICATIONS

Markley, K. S., "Soybeans and Soybean Products", vol. 1, Interscience Publishers, Inc., N.Y., 1950, pp. 296–299.

*Primary Examiner*—Robert A. Yoncoskie
*Attorney, Agent, or Firm*—Browdy and Neimark

[57] ABSTRACT

A bland curd-like product is derived from glandless cottonseed by an aqueous extraction process. After a heat treatment of a cottonseed "milk", coagulation is allowed to occur and the whey is separated. The coagulum is then spray-dried to provide a product with longer shelf-life.

18 Claims, 9 Drawing Figures

FIG. 1

FIG. 2 Solids composition and material balance of all components in the production of CURD from glandless cottonseed kernels. This scheme assumes zero processing loss.

FIG. 3  Nitrogen composition and material balance of all components in the production of curd from glandless cottonseed kernels. This scheme assumes zero processing loss.

FIG. 4 Solids composition and material balance of all components in the production of curd from glandless cottonseed kernels. This scheme assumes zero processing loss.

*( ) Percent listed is approximate material balance based on 100% kernels.

FIG. 5 Nitrogen composition and material balance of all components in the production of curd from glandless cottonseed kernels. This scheme assumes zero processing loss.

*( ) Percent listed is approximate material balance based on 100% kernels.

FIG. 6 Solids composition and material balance of all components in the pilot plant production of curd from glandless cottonseed kernels. This scheme assumes zero processing loss.

*( )Percent listed is approximate material balance based on 100% kernels.

FIG. 7 Nitrogen composition and material balance of all components in the pilot plant production of curd from glandless cottonseed kernels. This scheme assumes zero processing loss.

*( ) Percent listed is approximate material balance based on 100% kernels.

FIG. 8 Solids composition and material balance of all components in the pilot plant production of curd from glandless cottonseed kernels. This scheme assumes zero processing loss.

*( ) Percent listed is approximate material balance based on 100% kernels.

FIG. 9 Nitrogen composition and material balance of all components in the pilot plant production of curd from glandless cottonseed kernels. This scheme assumes zero processing loss.

*( ) Percent listed is approximate material balance based on 100% kernels.

PROCESS FOR PREPARING A CURD-LIKE PRODUCT FROM COTTONSEED AND OTHER OILSEEDS

FIELD OF THE INVENTION

This invention relates to food products, and especially to food products obtainable from oilseeds, as, for example, glandless cottonseed, deglanded cottonseed and peanuts.

BACKGROUND OF THE INVENTION

World-wide attention has been directed toward defining and seeking solutions to the problem of protein deficient diets among large portions of the world's population. Many studies, taking into consideration expansion rates, have concluded the world is running out of food. The upward trend in world population and increasing cost of traditional animal food proteins has provided strong incentives for utilization of oilseed proteins directly in human diets. Acceptability of oilseed protein products in terms of their functional properties in food systems and nutritional value will largely determine the extent of their utilization by the food industry.

Cottonseed is one of the principal oilseeds of the world and in recent decades has been studied as a possible source of food protein. The development of a process to remove its gossypol-containing pigment glands (Gardner et al., U.S. Pat. No. 3,972,861) and the genetic development of a variety of "glandless" cottonseed (GLCS) has provided a raw material capable of use in foods. Processes have been developed to produce flours, concentrates, and isolates. GLCS kernels are currently available commercially; however, the development of a market for products incorporating this edible oilseed has not been achieved. Investigators at the Food Protein Research and Development Center at Texas A&M University have already tested the utility of cottonseed products in several food applications (Cater et al., 1977; Lawhon, J. T., Cater, C. M. and Mattil, K. F. 1970 "Preparation of a high-protein low-cost nut-like food product from glandless cottonseed kernels" Food Technol. 24:77; Lawhon, J. T., Cater, C. M., and Mattil, K. F. 1972a "A whippable extract from glandless cottonseed flour" J. Food Sci. 37:317; Lawhon, J. T., Rooney, L. W., Cater, C. M., and Mattil, K. F. 1972b "Evaluation of a protein concentrate produced from glandless cottonseed flour by wet extraction process" J. Food Sci. 37:778; Lawhon, J. T., Cater, C. M. and Mattil, K. F. 1975 "Sensory, analytical evaluation of cake doughnut fortified with protein from oilseed flours" Food Prod. Dev. 9:110; Lawhon, J. T., Cater, C. M. and Mattil, K. F. 1977 "Evaluation of the food use potential of sixteen varieties of cottonseed" J. Am. Oil Chemists' Soc. 54:75; Green, J. R., Lawhon, J. T., Cater, C. M. and Mattil, K. F. 1976 "Protein fortification of corn tortillas with oilseed flours" J. Food Sci. 41:656; Green, J. R. Lawhon, J. T., Cater, C. M., and Mattil, K. F. 1977 "Utilization of whole undefatted glandless cottonseed kernels and soybeans to protein-fortify corn tortillas" J. Food Sci. 42:790). One such product, "Tamunuts", has been developed by roasting the glandless kernels. Roasted kernels have been used in various foods as a nut replacement. In experimental cookery, GLCS flour, concentrates, and isolates have also been successfully integrated into food systems; however, these latter products are not presently available on a commercial basis.

Curd-like products such as tofu have long been prepared from soybeans. Traditional Chinese curd is prepared in the following manner; whole soybeans are soaked overnight in tap water. The soaked soybeans are blended with water and the mixture filtered through a linen cloth. The soybean milk is then steamed for 30 minutes or brought to boiling and heated at that temperature for 5 minutes, cooled to about 70° C. or 50° C. and precipitated with calcium sulphate. When the curd forms, it is cut into cubes with a knife to facilitate the release of whey. The curd is then gently pressed overnight. Variations of this procedure occur after preparation of the soybean milk to yield different textures of the final tofu product, for example, cotton grade tofu or silk tofu, based on percentage of calcium sulphate added. The tofu has also been frozen and another process produces an instant dried powder. Various processes for the preparation of soybean tofu and its incorporation into food systems is detailed by Shurtleff, W. and Aoyagi, A. 1975: "The Book of Tofu: Food for Mankind". Autumn Press, Inc., Mass.

Another process has been developed by Schroder, D. J. and Jackson, H. 1972 "Preparation and evaluation of soybean curd with reduced beany flavor" J. Food Sci. 37:450, in which a soybean curd is produced with reduced beany flavor. In their process, whole soybeans were quickly rinsed in cold water and placed in a 1-gal blender together with boiling water. The ratio of water to beans was 9:1 and the temperature of the water between 85°-95° C. The beans and water were then blended at full speed for 3 minutes. The resulting suspension was held at approximately 100° C. for 30 minutes by injection of live steam. After the steam treatment, the suspension was filtered through muslin bags to yield two fractions—a soybean milk and residue. The milk was maintained at 80° C. and the curd precipitated by the addition of 0.2% calcium sulphate. The curd was allowed to stand a further 30 minutes, the temperature being approximately 80° C. throughout. The curd was placed in small cheese hoops and allowed to drain freely for a short time, after which it was pressed overnight at a pressure of approximately 1 psi.

Microstructure analyses of soybean protein aggregates or curd has found that heat denaturation of the protein was necessary in forming the network structure of the aggregates (Lee, C. H. and Rha, C. 1978 "Microstructure of soybean protein aggregates and its relation to the physical and textural properties of the curd" J. Food Sci. 43:79). The three dimensional network structure of the aggregate derived from heated soybean protein showed a low sedimentation rate, high curd yield, high water-holding capacity, low value of hardness and high springiness compared to the unheated precipitates of globular structure.

SUMMARY OF THE INVENTION

Oilseeds vary physically and chemically, for example, in size, shape, color, solubility, amino acid composition, interaction with chemicals, etc. For this reason, the procedures used for producing a curd-like protein product from soybeans cannot be used to make a curd-like protein product from cottonseed. Using the soybean process for cottonseed resulted in an inferior product, adverse flavor, and low recovery of solids and nitrogen. In cottonseed, two different proteins have been isolated; what is called a non-storage protein (NSP) and a storage protein (SP). The NSP comprises 30% of the nitrogen and has maximum insolubility at pH 4 to 6, and the SP comprises 70% of the nitrogen and has maximum insolubility at pH 6.5–7.5. It is necessary to understand the inherent characteristics of the oilseeds before an optimum process can be devised. No one has developed a process for the recovery of a high protein curd-like food from cottonseed. In addition, no one has developed a process for the recovery of a high protein curd-like food from a variety of oilseeds with a minimum amount of variation, for example, in solubility and soaking of the oilseed. Therefore, there is a need for an economical process for producing a high protein food product derived from vegetable material which recovers substantially all of the nutritional parts of the vegetable material. The resultant product should be of good initial flavor and be stable with minimal rancidity and minimal flavor development in storage. The product should also be compatible with other food materials so that it can be combined with these food materials to yield nutritious and palatable foodstuffs.

It is, accordingly, an object of the present invention to overcome defects in the prior art, such as indicated above.

It is another object to provide means for increasing the world's food supply by providing a palatable foodstuff from a foodstuff source previously underutilized.

It is a further object to provide a tasty curd-like protein product from previously unusable oilseeds, such as cottonseed.

It is yet another object to provide a process for making a palatable curd product from oilseeds such as cottonseed.

It is still another object to provide for a high protein food product from cottonseed which retains substantially all the nutritional parts of the cottonseed, and which is of good initial flavor and is stable with minimal rancidity and minimal flavor development in storage.

A further object is to provide a cottonseed curd which is compatible with other foods to yield nutritious and palatable foods.

These and other objects, as will be more apparent below, are achieved in accordance with the instant invention by carrying out a process for producing from oilseed a curd-like product with the above features. The process is particularly satisfactory when whole raw glandless cottonseed kernels are the source material, although glandless and deglanded products of flour, flakes, concentrates, and isolates, toasted kernels, and other oilseed, for example, peanuts, are used. Less time is required utilizing this process and a product with bland flavor characteristics is produced. The process involves forming oilseed "milk" slurry from water and comminuted oilseed, e.g. cottonseed flour, heating preferably the slurry or alternatively the filtrate thereof to boiling temperature and preferably adding salt to coagulate the protein, separating the resultant whey and then either directly using the resultant coagulum, i.e. curd, or spray-drying the curd for formation into texturized protein or incorporation into other food products.

BRIEF DESCRIPTION OF DRAWING

For a better understanding of the invention, as well as the above and other objects and the nature and advantage of the instant invention, possible embodiments thereof will now be described with reference to the attached drawing, it being understood that these embodiments are exemplary and not limitative.

DETAILED DESCRIPTION OF EMBODIMENTS

In the first step one part of weight oilseed (e.g. GLCS kernel) is finely comminuted, e.g. by grinding, to produce a full-fat flour. Maximum recovery is possible if cottonseed is ground dry, not wet, or rinsed before grinding. Hot to boiling water at pH preferably at or near that capable of solubilizing maximum protein from the seeds (optimum pH about 8 for GLCS) is then added (1:9 pilot plant, 1:4 bench scale, flour:water by wt) and the mixture is agitated for approximately 10 to 30 minutes, preferably about 15 minutes. The slurry produced is either filtered to yield an aqueous extract and a residue, or it is further processed without filtering. The slurry or extract is then heated with continuous stirring to boiling.

A salt dissolved in about 80 ml hot water is then preferably added in the ratio of about 14 g salt/lb kernels. Boiling alone will coagulate the protein, but binding is usually aided by the addition of a salt which will not poison the curd, hereinafter "non-toxic" salt, such as calcium sulphate, sodium chloride, sodium hydroxide, sodium phosphate, potassium phosphate, or sea salt, the latter of which was employed in most trials. The purpose of the salt is to charge the pH to a value of minimum protein solubility and thereby assist in the coagulation. Stirring is continued until the salt solution is dispersed.

Heating is continued for approximately 3 to 5 minutes. The heating stage is preferably followed by a slight cooling period to enhance recovery of the product. The coagulum is then separated from the whey by a two-phase centrifuge, i.e. the aqueous portion is separated from the full-fat curd.

The curd is directly useable as food, e.g. such as by the incorporation directly into food. Alternatively, the coagulum is spray-dried to provide a stable product which could be easily reconstituted. Reconstitution is best achieved at a pH higher than 7 or lower than 7 due to the product solubility.

Figure 1:
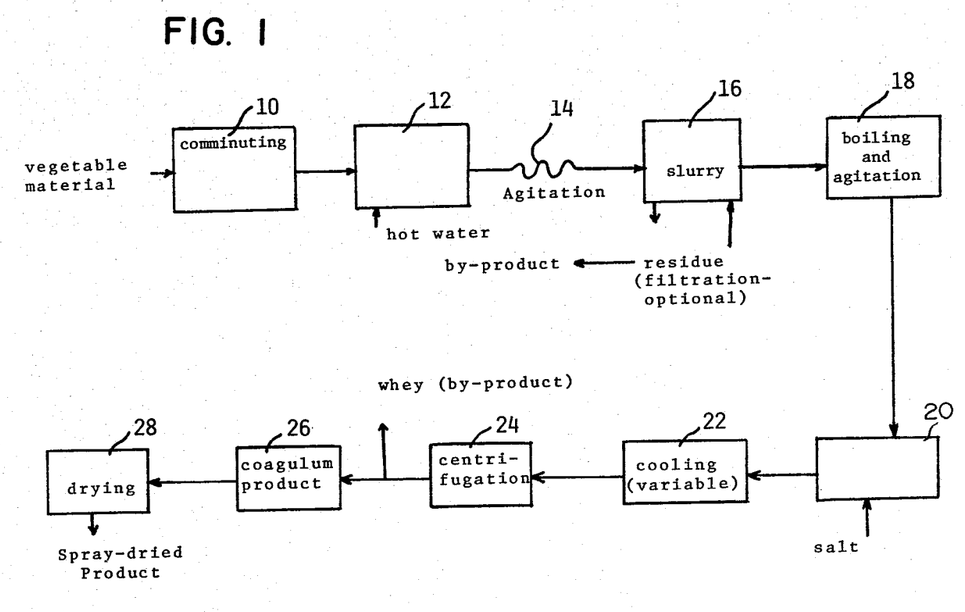
FIG. 1 is a flow diagram illustrating a preferred process in accordance with the present invention.

Referring to FIG. 1, an oilseed (GLCS kernels) is comminuted in a grinder 10 to yield a full-fat flour. Hot to boiling water (at an optimum pH of 8.0) is added immediately in stage 12 to destroy lipooxidase enzymes and inhibit the initiation of destructive chemical reactions. The mixture is then agitated in a mixer or blender at stage 14 to allow optimum surface contact to the ground particles by the water. Heat can be added at this time also. In stage 16, the slurry produced may be filtered to provide an aqueous extract and a residue as by-product, or alternatively, no separation need be effected and the residue can remain as finely dispersed particles. The aqueous extract or slurry is then heated to boiling (about 90° C.) in stage 18 at which time or thereafter in stage 20 a chemical solution (sea salt, calcium sulphate, sodium chloride, sodium phosphate, potassium phosphate—water mixture) is added. A slight cooling step is preferably carried out at stage 22. Centrifugation of the heated slurry to remove the whey or aqueous soluble portion is effected at stage 24, yielding a coagulum product at stage 26. Spray-drying of the coagulum with appropriate water content may be effected at stage 28.

As used herein, the expression "oilseed" refers to a seed cultivated primarily for its oil content and which also contains a protein dispersible, after comminution of the oilseed, in an aqueous solution; the term includes, but is not limited to cottonseed, peanuts, sesame seeds, sunflower safflower seeds and soybeans. Blends of oilseeds may be used if optimum extraction procedures are feasible. This process can be used with whole dehulled seeds with or without presoaking. Full-fat, partial fat- or defatted products where oil is desired as an economic base, may be used. Where it is desired to increase the caloric value or the fat content, full-fat or partial fat products may be used. Flours, concentrates, and isolates may also be used. If texturization is desired of the end spray-dried coagulum, a defatted or partially defatted product may be used.

As used herein, the term "comminuting" refers to any high speed process of size reduction including, but not limited to chopping, crushing, tearing, shredding, emulsifying, and grinding by suitable machinery, to produce a "comminuted" product.

It is desirable to comminute the oilseed to as fine a particle size as possible. The finer the grind of the material the larger the surface area available for extraction and thus the higher the yield of product. However, a coarse grind is also possible and may be advantageous, depending on the food system to be incorporated. The machinery desirably used for comminution is a hammermill; however, other comminuting machinery may be used. Various factors can be considered during comminution, for example, atmospheric pressure, or vacuum, to provide a more desirable product.

After comminution, the oilseed is agitated in the hot extraction solution (optimum recovery pH is about 8 for GLCS) during stage 14 for from 10 to 30 minutes, dependent on the particular type of oilseed. The purposes of the soaking and agitation in hot to boiling water is to maximize the amount of the nutritional elements extracted from the oilseed, to destroy any anti-nutritional factors and lipooxidase. However, overextended soaking periods tend to provide a product with off flavor usually due to hydrolysis of the lipids. Also, higher soaking times require increased capital for larger volume soaking equipment.

The extraction solution, e.g. hot water, entering stage 12 serves to extract primarily proteins and lipids from the oilseeds. The pH of the extraction solution should be optimum for obtaining the highest percentage of protein. The temperature of the extraction solution should be preferably near boiling (e.g. about 90° C.). Temperatures near boiling serve to destroy the lipooxidase, and are also believed to remove volatile components detrimental to flavor. From 3 to 15 parts by weight of the hot extraction solution per part oilseed are desirably used. Less than 3 parts normally finds the resulting slurry too viscous to handle. On a bench scale run using GLCS kernels, a 1:4 ratio was used: and in a pilot plant run, a 1:9 ratio was used.

After a slurry is produced and boiled, separation of the residue from the aqueous extract can then be achieved, if desired, in stage 16. Separation at this point by centrifugation (bench scale) was not favorable as any substantial centrifugation appears to remove an essential coagulating factor from the "milk"; therefore, some means other than centrifugation should be carried out, such as filtration. The residue, which has a nutty flavor, can be incorporated into food systems, for example, a granola or cereal.

Alternatively, with oilseeds of fine particle size, for example GLCS, the residue need not be separated. In this preferred case, while agitation is being carried out (stage 14), increased heating can occur as well to bring the slurry to boiling temperature. When this occurs, a suitable chemical may be added which effects or aids coagulation of the protein. For GLCS, sea salt provided an excellent coagulum with optimal yields of nitrogen and solids recovered. Carbohydrates recovered were kept to a minimum due to its solubility which is an asset to the end product in regard to non-enzymatic browning.

Thus, the resultant GLCS "milk" leaving stage 16 will coagulate upon heating to boiling (about 90° C.) in stage 18; however, a more cohesive product results with the addition of a chemical in stage 20. Any non-toxic chemical which does not irreversibly react with the proteins, carbohydrates, or lipids in the source oilseed may be employed. The preferred chemical is sea salt because it is inexpensive, is a natural source, and is readily available. Consistent product was observed with its use. However, other chemicals may be used such as calcium sulphate, sodium chloride, sodium phosphate, potassium phosphate, etc. It should be noted that while the use of chemical coagulant is not essential, heating to boiling by stage 18 is essential.

The resultant coagulum mixture can then be cooled slightly at stage 22 to prevent possible degradation of components and provide a firmer coagulum. Separation of the aqueous extract or whey from the coagulum can be done by 2-phase centrifugation at stage 24. The coagulum can then be spray-dried at stage 28 to yield a chemically and microbiologically shelf-stable product. The whey can be further processed such as by membrane filtration to remove the proteins, or it can be used to prepare food products, for example, Ricotta cheese-type product, or be used in beverages.

What makes the invention different from soybean processing is basically:

1. the initial comminution of dry kernels which allows finer particles for maximum water contact;

2. soaking in hot to boiling water with agitation after comminution which reduces adverse flavor, minimizes total time for production and minimizes heating of oilseeds which could lead to nutritional decomposition;

3. the option to include residue or fiber within the product if finely ground oilseeds are used;

4. no delay in curd formation after boiling and/or salt addition which minimizes heating of oilseeds which could lead to nutritional decomposition; and 5. description of curd (i.e.) movement of coagulated product through pipes to centrifuge, does not alter recovery of solids; or removal of water from curd as feasible using descriptive technique. This allows for simple and rapid recovery of the curd within processing.

These and other features of the invention are demonstrated by the following illustration examples.

EXAMPLE 1

Figure 2:
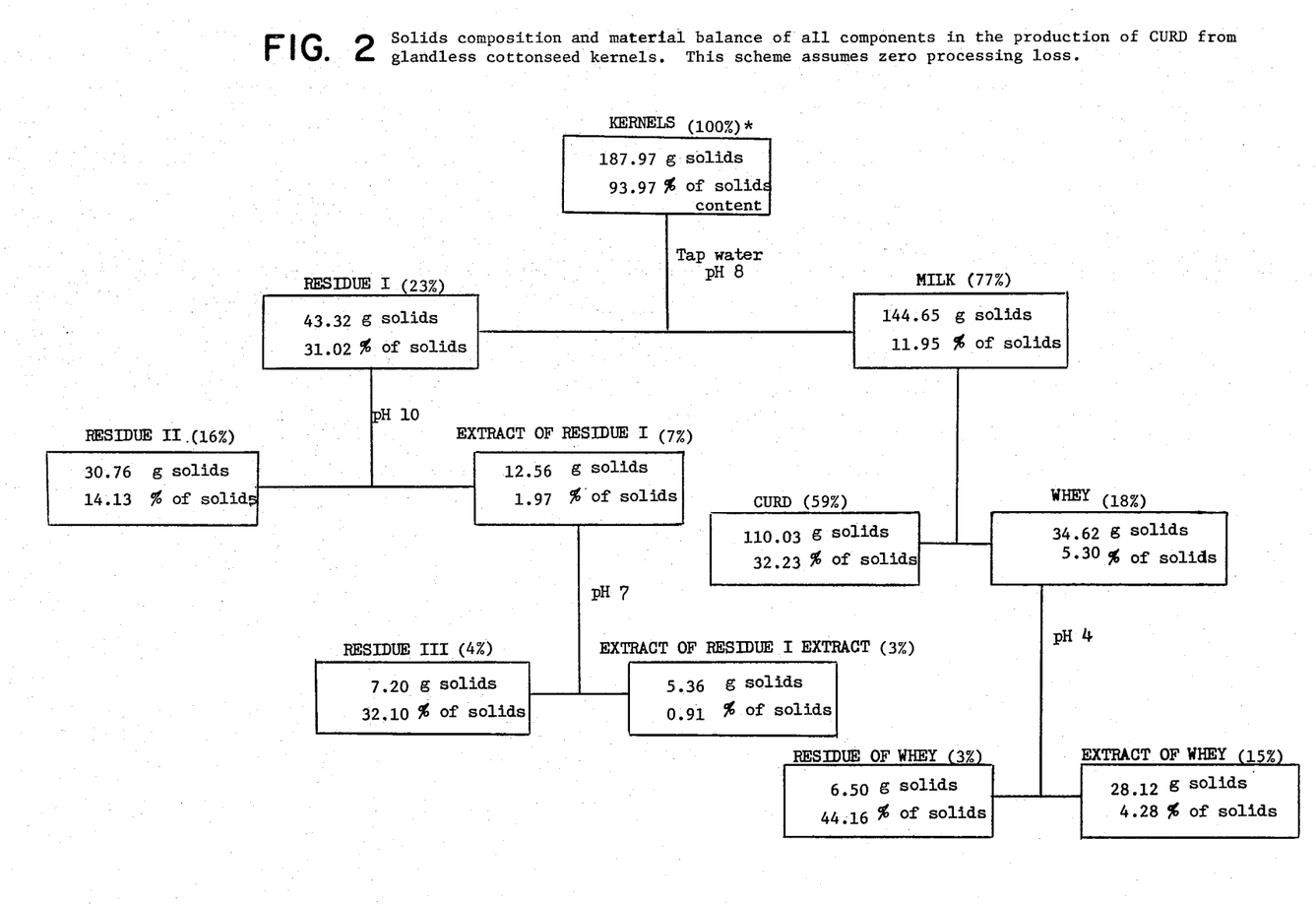
FIG. 2 is a chart showing solids composition and material balance, corresponding to Example 1.
Figure 3:
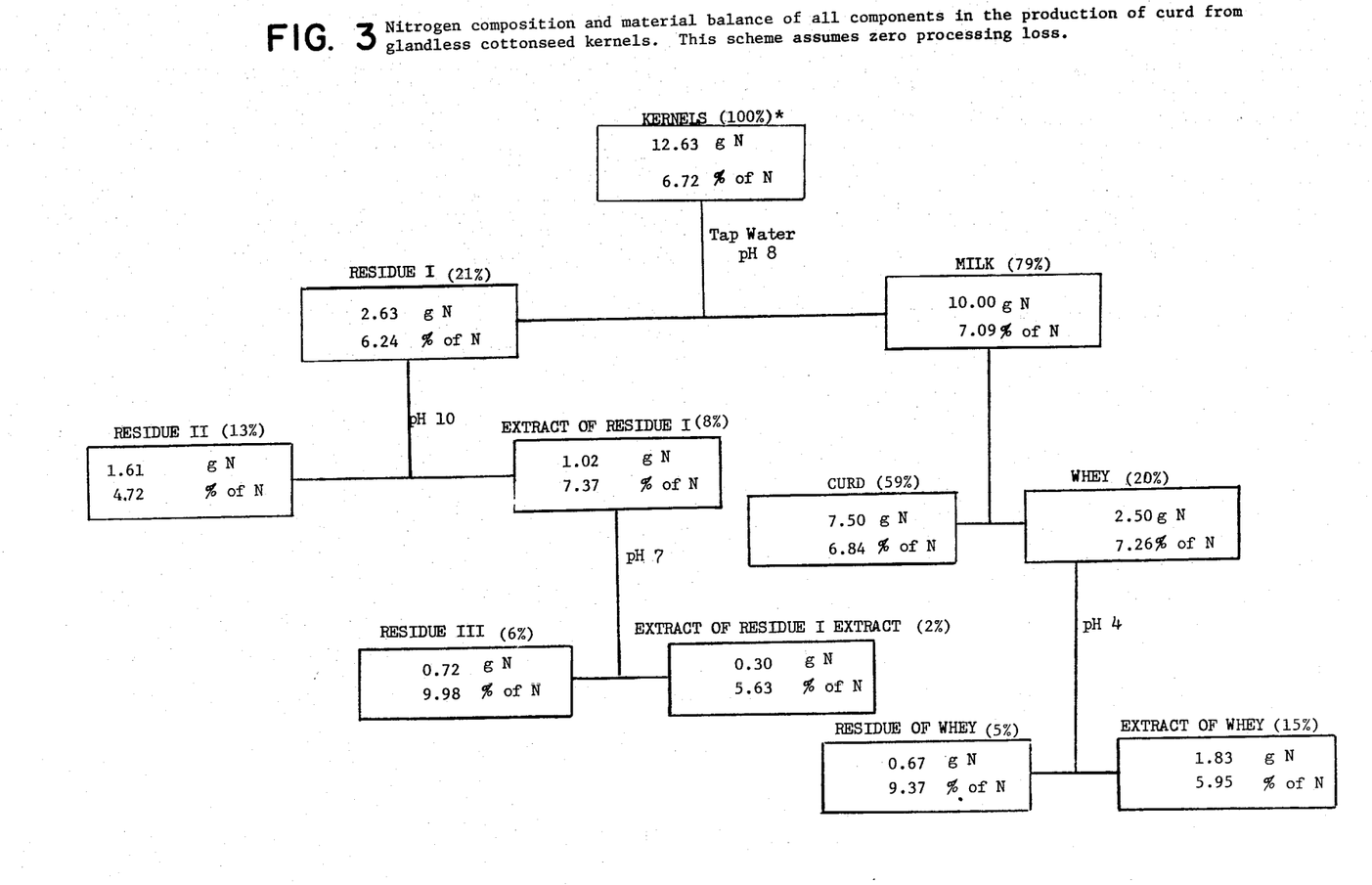
FIG. 3 is a chart showing nitrogen composition and material balance, corresponding to Example 1.

Whole glandless cottonseed kernels (200 g) were comminuted in a Waring blender. One liter of tap water (about pH 8) was added to the slurry agitated for 20 minutes. Next, the mixture was filtered using cheese cloth to remove the residue. The aqueous portion of about pH 7, was heated to boiling and sea salt (14 g salt/lb kernels) dissolved in 80 ml hot water was added. Stirring was continued until the salt was dispersed and the stirring was then terminated. Heating was continued for less than 5 minutes and coagulation resulted. The coagulum mixture was cooled slightly and the whey filtered from the coagulum with cheese cloth. The two by-products, the residue and whey were further processed to determine % nitrogen and % total solids of each intermediate product. The residue was adjusted to pH 10, the pH of maximum solubility. The aqueous extract recovered was then adjusted to pH 7, pH of maximum insolubility. The whey was adjusted to pH 4, pH of maximum insolubility. The material balance is depicted in FIGS. 2 and 3.

EXAMPLE 2

Figure 4:
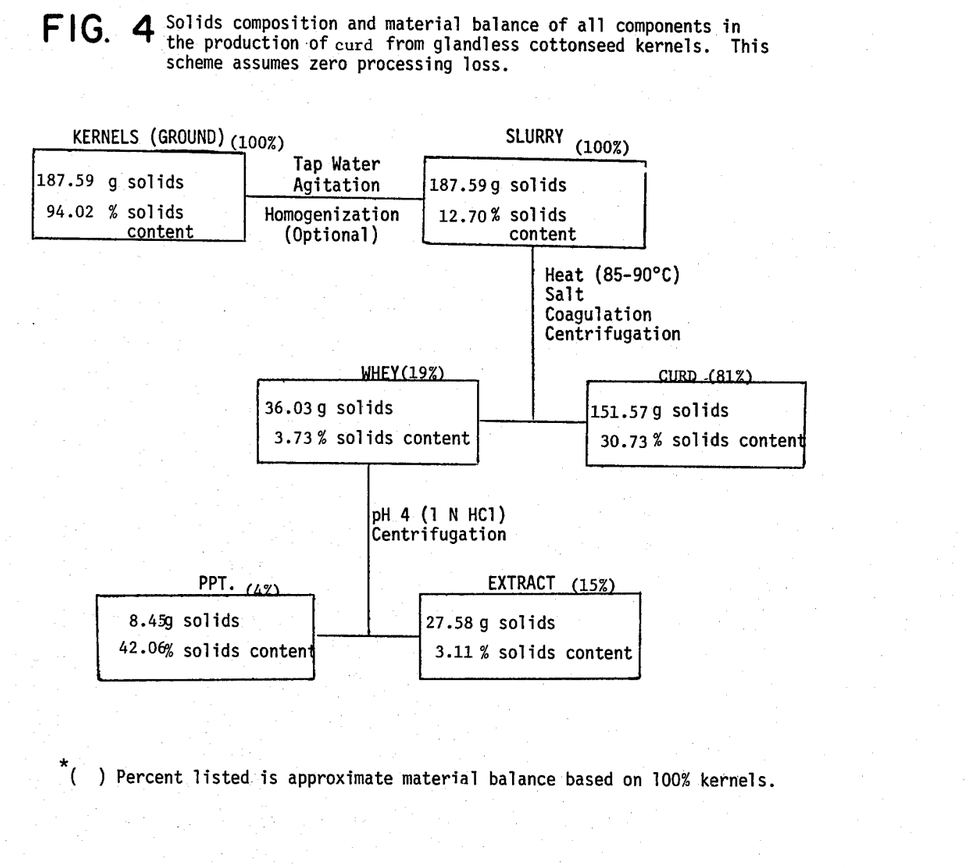
FIGS. 4 and 5 are charts showing, respectively, solids composition and material balance, and nitrogen composition and material balance, corresponding to Example 2.
Figure 5:
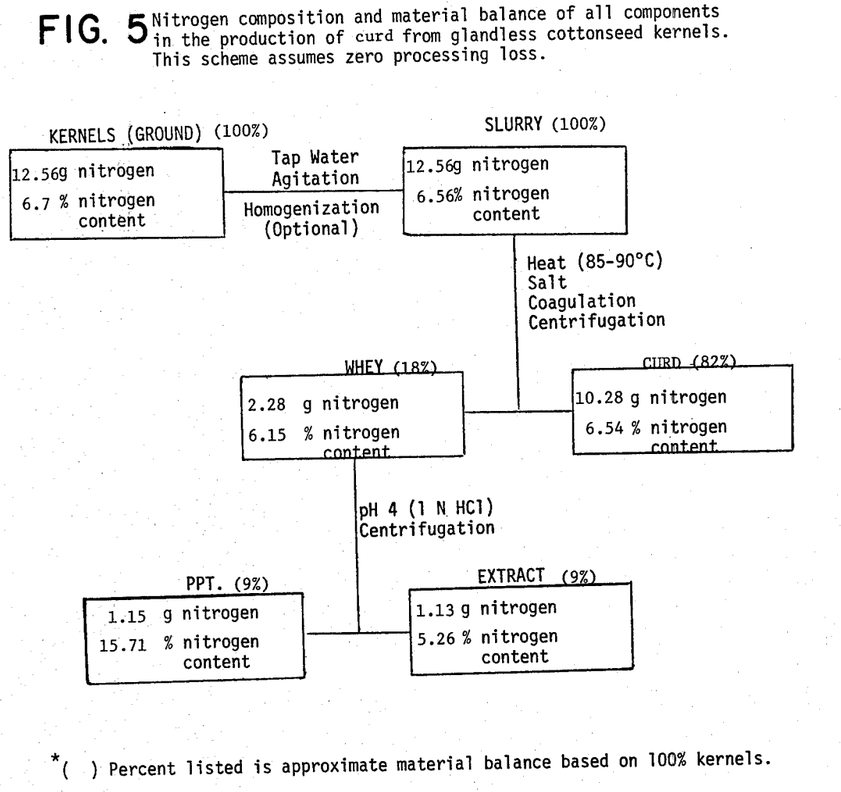

Whole glandless cottonseed kernels (200 g) were comminuted in a Waring blender. One liter of tap water (about pH 8) was added and the slurry agitated for 20 minutes. Next, the mixture was heated to boiling and sea salt (14 g salt/lb kernels) dissolved in 80 ml hot water was added. Stirring was continued until the salt was dispersed and then stirring was terminated. Heating was continued for less than 5 minutes. The resultant coagulum mixture was cooled slightly and the whey separated from the coagulum by centrifugation (5,000 rpm for 10 minutes). The one by-product, whey, was further processed to determine % nitrogen and % total solids of the product. The whey was adjusted to pH 4, pH of maximum insolubility. The material balance is depicted in FIGS. 4 and 5.

EXAMPLE 3

Whole glandless cottonseed kernels (200 g) were comminuted in a Waring blender. One liter of distilled water (about pH 6) was added and the slurry agitated for 20 minutes. Next, the mixture was filtered using cheese cloth to remove the residue. The aqueous portion, about pH 6, was heated to boiling and sea salt added (14 g salt/lb kernels dissolved in 80 ml hot water). Stirring was continued until the salt was dispersed and then stirring was terminated. Heating was continued for less than 5 minutes. The resultant coagulum mixture was cooled slightly and the whey filtered from the coagulum with cheese cloth.

EXAMPLE 4

Whole glandless cottonseed kernels (200 g) were comminuted in a Waring blender. One liter of tap water was added and the slurry agitated for 20 minutes. Next, the mixture was separated by centrifugation. The aqueous portion was heated to boiling and sea salt added. No coagulation occurred; this example shows that centrifugation is not a desirable mode for removal of the residue.

EXAMPLE 5

Whole glandless cottonseed kernels (100 g) were comminuted in a Waring blender. Five hundred ml of tap water was added and the slurry agitated for 20 minutes. The slurry was heated to boiling and sea salt added (14 g salt/lb kernels dissolved in 80 ml hot water). Stirring was terminated when the salt was dispersed and heating was continued for less than 5 minutes. The resultant coagulum mixture was centrifuged warm and the curd collected. Percent recovery of the curd was similar to that coagulum mixture which was centrifuged while cool. Refrigeration while centrifuging was also used.

EXAMPLE 6

Whole glandless cottonseed kernels (100 g) were comminuted in a Waring blender. Five hundred ml of tap water was added and the slurry agitated for 20 minutes. The slurry was heated to boiling and various types of individual salts, sea salt, calcium sulphate, sodium chloride (as well as no salt as a control) were added to batch prepared. In addition, trials were carried out in which the various salts were added without boiling. Stirring was terminated when the salt was dispersed and heating was continued for less than 5 minutes. In each case where boiling was effected, the coagulum mixture was cooled slightly and centrifuged. The pH of the whey was about 6.5 in all cases and recovery was good. Addition of any salt before boiling (about 90° C.) and with no subsequent boiling resulted in no coagulum being produced; this shows that boiling is necessary to obtain coagulation.

EXAMPLE 7

Whole glandless cottonseed kernels (100 g) were comminuted in a Waring blender. Five hundred ml of hot tap water was added and the slurry agitated for 15 minutes. The slurry was then heated to boiling and sea salt added (14 g salt/lb kernels dissolved in 80 ml hot water). Stirring was terminated when the salt was dispersed and heating was continued for less than 5 minutes. The coagulum mixture was cooled slightly and centrifuged. Percent recovery of the curd was excellent. Addition of hot tap water reduced agitation and heating time and eliminated any possibility of off flavor which could occur during the first part of the process.

EXAMPLE 8

Defatted glandless cottonseed flour (100 g) was mixed with tap water (1 liter) and the mixture agitated for 30 minutes. The slurry was filtered; however, no residue was recovered due to the fine particles. The slurry was heated to boiling and sea salt added to the same ratio as previous described. Stirring was terminated when the salt was dispersed and heating was continued for less than 5 minutes. The resultant coagulum mixture was cooled slightly and filtered. Percent recovery of the curd was good. Curd was not as firm as full-fat kernels; but incorporation into food systems, hamburger-type product was good.

EXAMPLE 9

Whole toasted peanuts (100 g) were comminuted in a Waring blender. Five hundred ml of tap water was added and the slurry agitated for 20 minutes. The slurry was either filtered to produce a residue and an aqueous extract, or it was not filtered and the whole slurry was used for trial. For each case, the extract or slurry was heated to boiling and sea salt added (14 g salt/1 g starting material dissolved in hot water). Stirring was terminated when the salt was dispersed and heating was continued for less than 5 minutes. In each case, the resultant coagulum mixture was cooled slightly and filtered. A curd was produced, however, not at optimum recovery. The filtered sample produced a firmer curd than the non-filtered, and the latter had an oil layer in the whey.

It is possible to produce a curd from toasted peanuts. It may be desirable to remove all the oil or a portion of the oil since they comprise a large portion of the peanut.

EXAMPLE 10

Whole toasted glandless cottonseed kernels (100 g) were comminuted in a Waring blender. Five hundred ml tap water was added and the slurry agitated for 20 minutes. The slurry was then heated, salt added, and the mixture filtered. A curd was produced. It is possible to produce a curd-like product from a heat treated product (toasted GLCS kernels).

EXAMPLE 11

Commercial grade whole glandless kernels were comminuted in an Alpine mill. They were immediately suspended in a tap water (pH 8) in a large vat in a 1:9 ratio of kernel:water and agitated for 30 minutes. While agitating, the slurry was heated to boiling (85°–90° C.). A sea salt solution (14 g salt/lb kernels) was added while the slurry was hot. Stirring was stopped and the tank was cooled in place with chilled water. This took about two hours to reach refrigeration temperature. Centrifugation was done by a Westfalia to separate the resultant coagulum from the whey, the mixture being fed at the rate of 9 lb/min with desludge at 3 minutes. The coagulum was then spray-dried (Anhydro Spray Dryer) at a 400° F. inlet and 190° F. outlet. Based on zero processing loss, the solids content recovered was 59% and the nitrogen recovered was 74%. Analysis of the spray-dried constituents is seen in the following table:

Protein: 49.24%
Lipid: 30.75%
Moisture: 5.23%
Crude fiber: 2.33%
Ash: 6.45%
Gossypol:
  Free: 0.0027%
  Total: 0.0207%

Figure 6:
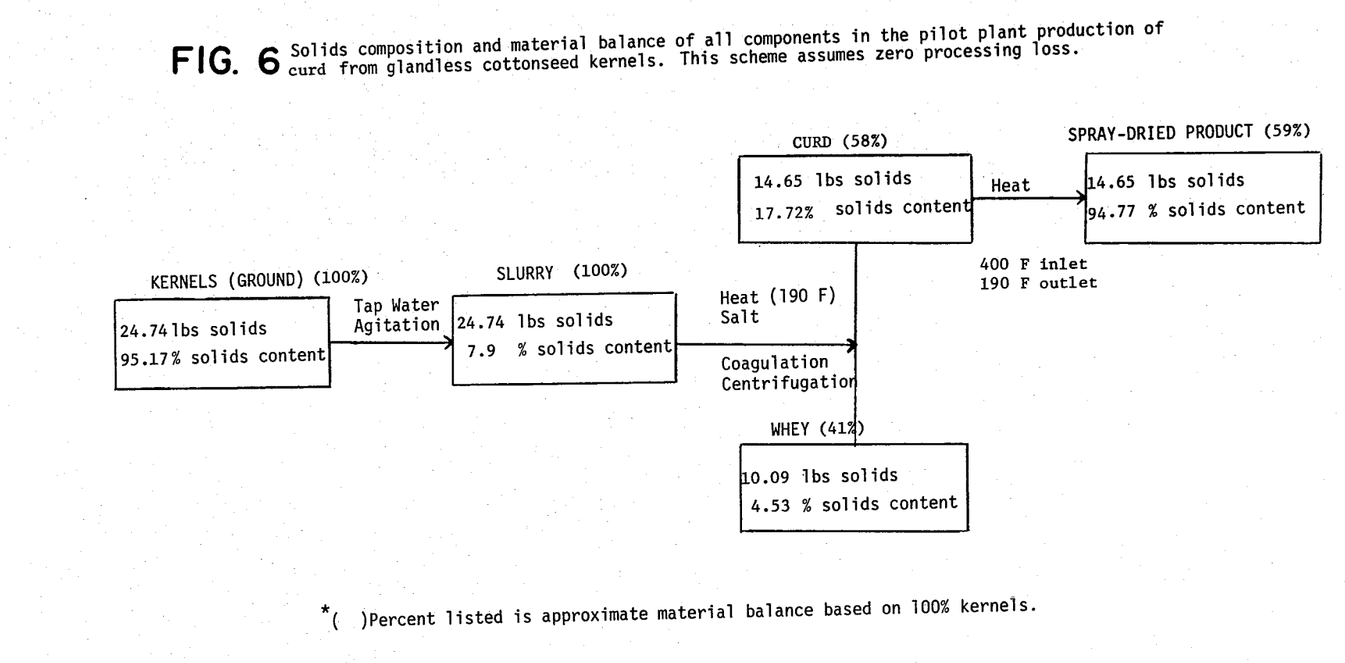
FIGS. 6 and 7 are charts showing, respectively, solids composition and material balance, and nitrogen composition and material balance, corresponding to Example 11.
Figure 7:
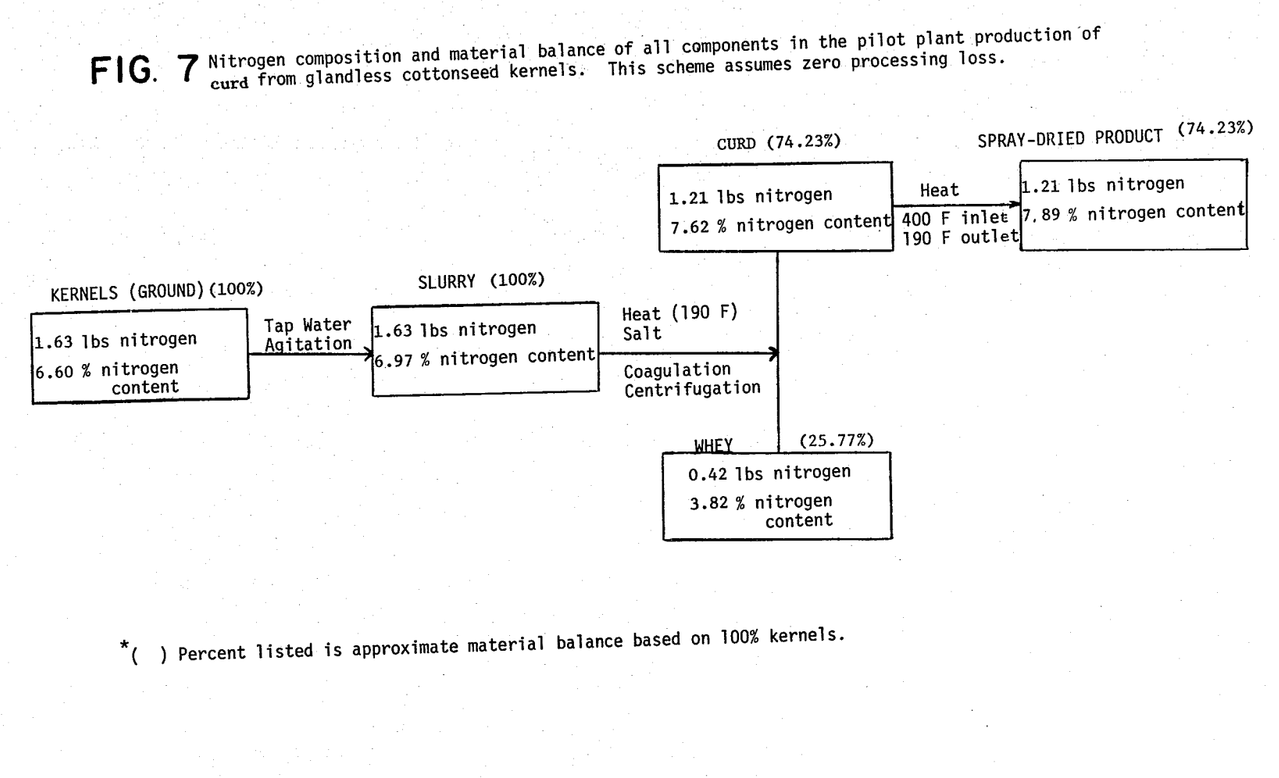

The solids composition and material balance of all components in the pilot plant production of curd from glandless cottonseed kernels is depicted in FIGS. 6 and 7. These schemes assume zero processing loss. The amino acid composition of the spray-dried curd as compared to the raw GLCS starting material is seen in Table 1.

Results of the TBA test for rancidity are seen in Table 2. A slight increase in the TBA number was observed after 4 weeks. A decrease in TBA number is seen after 8 and 12 weeks storage for all temperatures. No statistical difference was observed in either of the two parameters during storage. The explanation is listed below following Example 12.

The microbiological analyses of this pilot plant run are seen in Table 3. They indicate that no increase in microbial growth occurred with time.

TABLE 1

Amino acid composition[a] of glandless cottonseed (GLCS) and spray-dried curd.

| | Grams of amino acid per 16 grams sample nitrogen | |
|---|---|---|
| Amino acid | GLCS kernels[b] | Spray-dried Tamucurd |
| Lysine | 4.5 | 3.3 |
| Histidine | 2.7 | 2.8 |
| Ammonia | 2.0 | 1.7 |
| Arginine | 12.1 | 10.6 |
| Tryptophan | 1.2 | 1.4 |
| Cysteic acid | 1.2 | 1.4 |
| Aspartic acid | 9.1 | 8.8 |
| Threonine | 3.0 | 2.9 |
| Serine | 4.2 | 4.5 |
| Glutamic acid | 21.6 | 17.4 |
| Proline | 3.4 | 3.6 |
| Glycine | 4.1 | 3.8 |
| Alanine | 3.9 | 3.8 |
| Valine | 4.4 | 4.7 |
| Methionine | 1.4 | 1.1 |
| Isoleucine | 3.0 | 3.3 |
| Leucine | 5.7 | 6.0 |
| Tyrosine | 2.9 | 2.5 |
| Phenylalanine | 5.4 | 5.8 |
| Available lysine | 4.1 | 3.4 |

[a] Expressed on the basis of 16 g of sample nitrogen.
[b] Lawhon, J. T. et al. JAOCS 54:75 (1977).

TABLE 2

Thiobarbaturic acid number of the full-fat spray-dried curd during 12 weeks incubation at 7° C., 23° C. and 35° C., with oxygen (head space) of 75 ml, 160 ml, and 204 ml.

| Time (wks) | Temp (°C.) | Head Space (ml) | | |
|---|---|---|---|---|
| | | 75 | 160 | 204 |
| 0 | | 0.66 | | |
| 2 | 7 | 0.91 | 0.86 | 0.89 |
| | 23 | 0.77 | 0.82 | 0.82 |
| | 35 | 0.75 | 0.72 | 0.78 |
| 4 | 7 | 1.39 | 1.49 | 1.63 |
| | 23 | 1.74 | 1.49 | 1.31 |
| | 35 | 1.32 | 1.34 | 1.27 |
| 8 | 7 | 0.95 | 0.83 | 1.00 |
| | 23 | 0.83 | 0.81 | 0.82 |
| | 35 | 0.83 | 0.81 | 0.91 |
| 12 | 7 | 0.79 | 0.79 | 0.82 |
| | 23 | 0.75 | 0.83 | 0.75 |
| | 35 | 0.81 | 0.84 | 0.86 |

TABLE 3

Microbiological analyses of the full fat spray-dried curd during 12 weeks incubation at 7° C., 23° C. and 35° C.

| Time (wks) | Temp (°C.) | APC per g | TBC per g | Coliforms MPN/g | Fecal coliforms MPN/g | E. coli MPN/g | S. aureus MPN/g | Salmonella +/− per 25 g | Yeast/Mold per g[a] |
|---|---|---|---|---|---|---|---|---|---|
| 0 | | 85,000 | — | 9.1 | <3.0 | <3.0 | <3.0 | — | 400 |
| 2 | 7 | 75,000 | 1,700[a] | 43.0 | 3.6 | 3.6 | <3.0 | — | 700 |
| | 23 | 50,000 | 3,100 | 23.0 | <3.0 | <3.0 | <3.0 | — | 400 |
| | 35 | 50,000 | 5,200 | 23.0 | <3.0 | <3.0 | <3.0 | — | 400 |
| 4 | 7 | 62,000 | 2,000[a] | 15.0 | <3.0 | <3.0 | <3.0 | — | 300 |

TABLE 3-continued

Microbiological analyses of the full fat spray-dried curd during 12 weeks incubation at 7° C., 23° C. and 35° C.

| Time (wks) | Temp (°C.) | APC per g | TBC per g | Coliforms MPN/g | Fecal coliforms MPN/g | E. coli MPN/g | S. aureus MPN/g | Salmonella +/− per 25 g | Yeast/Mold per g[a] |
|---|---|---|---|---|---|---|---|---|---|
|  | 23 | 42,000 | 4,500 | <3.0 | <3.0 | <3.0 | <3.0 | — | 400 |
|  | 35 | 40,000 | 3,900 | 3.6 | <3.0 | <3.0 | <3.0 | — | 500 |
| 8 | 7 | 59,000 | 900[a] | 23.0 | 3.6 | 3.6 | <3.0 | — | 200 |
|  | 23 | 54,000 | 2,400[a] | 3.6 | <3.0 | <3.0 | <3.0 | — | 300 |
|  | 35 | 51,000 | 4,500 | 3.6 | <3.0 | <3.0 | <3.0 | — | <100 |
| 12 | 7 | 52,000 | 900[a] | 23.0 | <3.0 | <3.0 | <3.0 | — | 100 |
|  | 23 | 61,000 | 2,700[a] | 3.6 | <3.0 | <3.0 | <3.0 | — | 100 |
|  | 35 | 27,000 | 5,200 | <3.0 | <3.0 | <3.0 | <3.0 | — | 100 |

[a]Estimated Aerobic Plate Count

EXAMPLE 12

Figure 8:
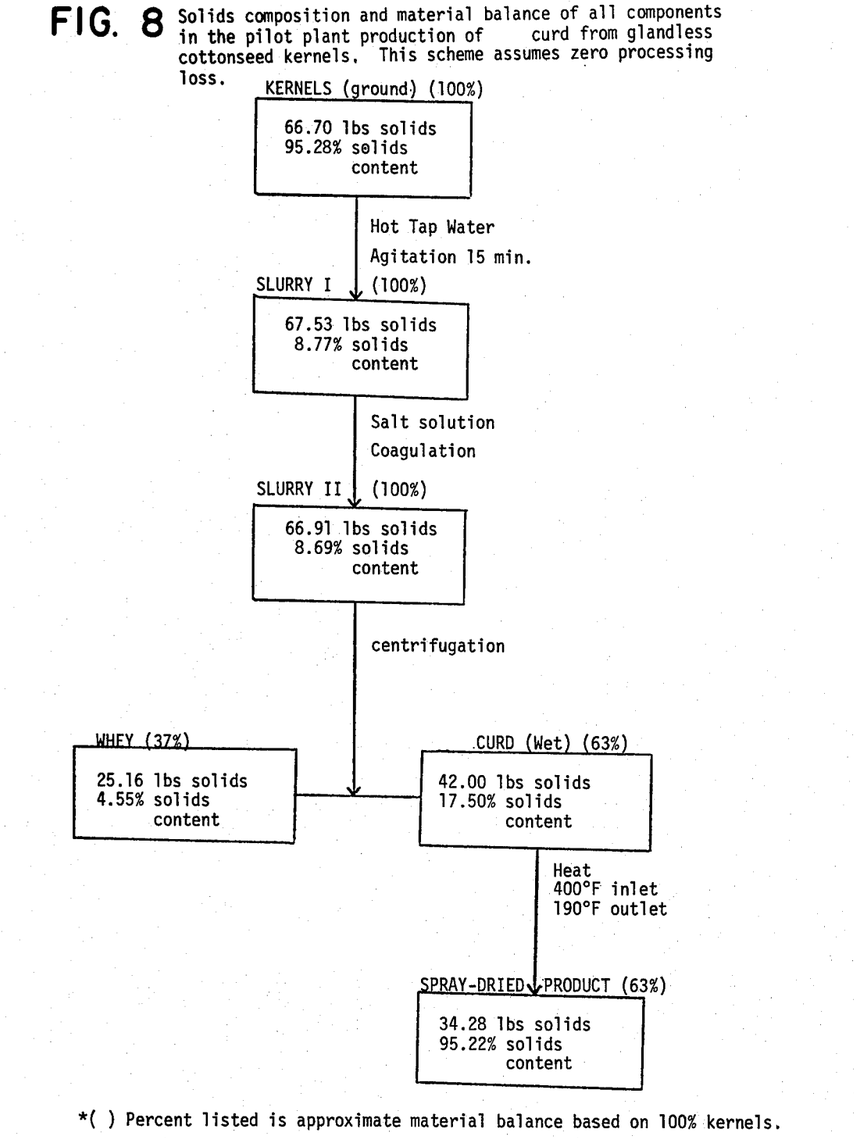
FIGS. 8 and 9 are charts showing, respectively, solids composition and material balance, and nitrogen composition and material balance, corresponding to Example 12.
Figure 9:
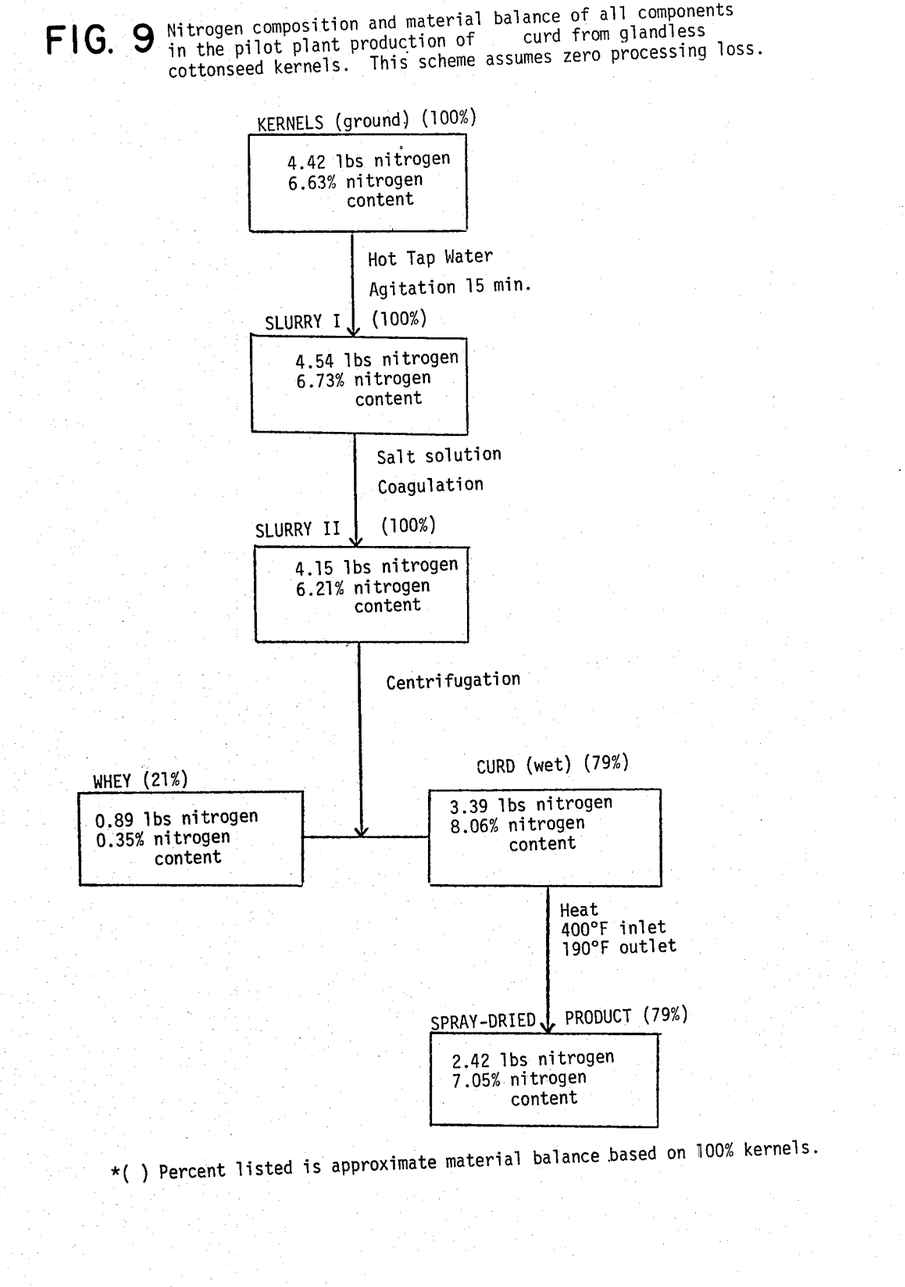

A second pilot plant run similar to Example 11 was carried out except that hot to boiling tap water was added and the heat was continued during agitation. Also, the cooling period was reduced to about 15 minutes. The proximate analysis and amino acid composition of the spray-dried product found results similar to the first pilot plant run (Example 11). The solids composition and material balance of all components in this pilot plant production of curd is depicted in FIGS. 8 and 9. The microbiological analyses were extremely good with an aerobic plate count of 4,500/g and an MPN of 3.0/g for coliforms.

Texturization studies were conducted on the spray-dry curd produced in this run.

The resultant spray-dried products exhibit high stability with minimal rancidity and flavor development in storage. It contains on the average about 5% moisture. A 2-thiobarbituric assay was carried out on the spray-dried product of the present invention. Considering that 29% oil was present in the spray-dried product, the TBA numbers were much lower than anticipated. The most important factor contributing to the low TBA values observed with this cottenseed product may be flavonoids, a natural chemical component of GLCS kernels. These compounds are known to function as primary antioxidants (Pratt, 1976). Both the coagulum and spray-dried product have been incorporated into foods as a meat analog or cream cheese substitute. In the latter situation, the GLCS curd, used as is as a synthetic cream cheese, provided a product with twice as much protein and less than one-half the fat of its diary counterpart.

When GLCS kernels are used as starting product, the wet coagulum revealed the following: moisture 66%, protein 14.2%, oil 12.8%, crude fiber 1%, and ash 5.0%. It was determined that sixty to eighty percent of the solids and nitrogen could be recovered from the starting materials, contingent on alternatives chosen in processing. When the residue was included with the aqueous extract, the higher percentage was recovered. The final spray-dried full-fat product contained approximately 5% moisture, 47% protein, 29% oil, 2.3% crude fiber, 2.9% carbohydrate, and 6.5% ash. Total gossypol in all products was less than 450 ppm (0.045%).

The amino acid profile and amino nitrogen in spray-dried curd (from which oil had been extracted) produced from GLCS kernels is depicted in Table 1. This is compared with GLCS kernels, the starting material. A slight difference (0.5 grams of amino acid per 16 grams sample nitrogen) is seen in lysine, arginine, glutamic, acid, and available lysine contents. The reduction in these amino acids with the spray-dried product may be partly due to heating involved in the spray-drying process, as amino acids may be destroyed under conditions of severe heat. Non-enzymatic browning, the reaction between amino acids or proteins and carbohydrates, also results in a decrease in available amino acids. The difference shown between GLCS kernels and spray-dried cottonseed product in available lysine may be an indication of the degree of non-enzymatic browning occurring in the spray-dried product because lysine, due to its epsilon-amino group, is most susceptible to non-enzymatic browning.

The fact that the spray-dried product of this process has high stability during storage is surprising in light of the accepted theory that a product with a high fat content at elevated temperature (35° C.) for 3 months with varying amounts of atmospheric oxygen head space would become rancid. No statistical difference was observed in either of the two parameters, temperature and oxygen, during storage. The reason for low rancidity may be partly due to non-enzymatic browning occurring concurrently with lipid peroxidation. Certain intermediates of non-enzymatic browning reaction have been shown to have anti-oxidant activity (Griffith and Johnson, 1957; Kirigaya et. al., 1968). In addition to reducing sugars, fatty acids undergoing autooxidation may contribute carbonyl groups for non-enzymatic browning. In fact, malonaldehyde which is measured in the TBA test has been shown to bind with proteins (Buttkus, 1967; Crawford et al., 1967; Kwon et al., 1965). However, as stated, the most important factor contributing to the low rancidity values may be flavonoids, a natural chemical component of GLCS kernels.

Microbiological analyses of the spray-dried cottonseed product indicated that no increase in microbial growth occurred with time (3 months). Strict sanitary conditions during processing can produce a microbiologically safe food product. The water activity of the spray-dried product is too low for growth to occur during storage.

Incorporation of the GLCS curd into a variety of foods showed exceptional promise. The curd was used as a meat analog and a cream cheese substitute in a number of dishes. Foods prepared include utilization of the product in a full course meal of salad, entree, vegetable, and dessert. A coffee-cake and fudge comprise two of the desserts which were prepared by directly substituting the GLCS curd for cream cheese. They were informally sampled and favorably received. No off-flavor was detected and no difference in physical appearance or texture was observed when compared to controls made with cream cheese. When the curd was added to these desserts, it provided twice as much protein and less than one-half the fat of dairy counterparts.

A link-type synthetic "sausage" product composed of 80% cottonseed curd with no meat included was made which proved appetizing to many. The curd was mixed with spices (e.g. chili and cumin), about 5% wheat gluten, cornstarch and dextrose, the latter of which are suitable thickeners; was pushed into casings and was steamed. The texture of the "sausage" which contained 80% curd was similar to potted meat; therefore, incorporation into soft foods seems promising. Its composition was similar to a meat wiener with 17% protein and less fat (13%). The links assumed the flavor of whatever spices were added.

Texturized synthetic "meat" may be formed from the dried curd. The texturized product may be mixed with ground meat such as hamburger and meat loaf at a level of 25% replacement. A very bland food results. For example, 20-25% water was added to the spray-dried curd and the mixture was cooked under pressure and then extruded to form the texturized product which was mixed with hamburger for patties and meat loaf.

A patty product was formed by adding caramel coloring to the curd to provide a coloring approximating that of hamburgers; 5-7% wheat gluten was added, patties were formed and then steamed for about 10 minutes. The patties were then cooled and crumbled. Spices were added, patties were re-formed, and then briefly fried.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A process for preparing a high protein curd product from protein containing glandless or deglanded cottonseed, comprising the steps of:
   providing 1 part by weight of comminuted cottonseed;
   adding from about 3 to about 15 parts by weight of water per part by weight of said comminuted cottonseed at pH and temperature sufficient to destroy antinutritional components and lipooxidase and to solubilize protein and lipid;
   agitating the cottonseed-water mixture from about 10 to 30 minutes;
   then heating the cottonseed-water mixture or a filtrate thereof to boiling to effect coagulation; and
   separating whey from coagulum.

2. A process in accordance with claim 1 wherein said heating to boiling is carried out on said cottonseed-water mixture.

3. A process in accordance with claim 1 wherein prior to said heating to boiling, the oilseed-water mixture is filtered to remove solid residue from aqueous filtrate, said heating to boiling being carried out on said aqueous filtrate.

4. A process in accordance with claim 2 or claim 3 wherein a non-toxic salt is added after said boiling to reduce the solubility of protein in liquid and thereby to assist in the coagulation.

5. A process in accordance with claim 1 wherein said water added to said comminuted cottonseed is hot water near the boiling temperature.

6. A process in accordance with claim 1 comprising the additional step of spray-drying the coagulum to yield a stable dry powder.

7. A process in accordance with claim 1 or claim 11 where the comminuted cottonseed is defatted cottonseed flour.

8. A process in accordance with claim 1 where the comminuted cottonseed is ground glandless or deglanded cottonseed flour.

9. A process in accordance with claim 1 where the comminuted cottonseed is toasted glandless cottonseed.

10. A process in accordance with claim 4 wherein the salt added is selected from the group consisting of calcium chloride, calcium sulphate, potassium phosphate, sodium phosphate and sodium chloride.

11. A process in accordance with claim 6 further comprising mixing said spray-dried powder with water and extruding the mixture to form a texturized product.

12. A cottonseed curd product having about 66% moisture produced by the process of claim 2.

13. A cottonseed curd product having about 66% moisture produced by the process of claim 3.

14. A texturized product formed according to the process of claim 11.

15. A stable spray-dried cottonseed curd produced by the process of claim 6.

16. A synthetic meat product comprising a mixture of a cottonseed curd product produced by the process of claim 1, spices, and wheat gluten.

17. A process in accordance with claim 1 wherein said pH is 6 to about 8.

18. A process in accordance with claim 1 wherein said comminuted cottonseed is formed from whole, full-fat glandless cottonseed.

* * * * *